(12) United States Patent
Fisher, Jr.

(10) Patent No.: US 6,779,823 B1
(45) Date of Patent: Aug. 24, 2004

(54) ALL-WEATHER STREET AND ROAD MAINTENANCE VEHICLE

(76) Inventor: Robert A. Fisher, Jr., 793 Oak St., Apt. 1, Brockton, MA (US) 02301

( * ) Notice: Subject to any disclaimer, the term of this patent is extended or adjusted under 35 U.S.C. 154(b) by 0 days.

(21) Appl. No.: 10/616,569

(22) Filed: Jul. 11, 2003

(51) Int. Cl.[7] ............................. F24H 3/06; E01H 5/10
(52) U.S. Cl. .................. 296/24.3; 296/161; 126/110 R; 126/271.1; 37/196; 37/219; 37/227
(58) Field of Search ............................ 296/24.3, 24.33, 296/24.35, 161; 244/134 R, 134 C; 126/99 R, 110 R, 271.1; 37/196, 219, 227, 228

(56) References Cited

U.S. PATENT DOCUMENTS

| | | | |
|---|---|---|---|
| 980,983 A | | 1/1911 | Meindl |
| 1,629,160 A | * | 5/1927 | Irving ........................ 239/130 |
| 2,681,828 A | * | 6/1954 | Pollard .......................... 134/5 |
| 3,404,470 A | | 10/1968 | Raiti |
| 3,805,766 A | * | 4/1974 | Hammon ............. 126/271.2 R |
| 4,723,733 A | * | 2/1988 | McClinchy ............. 244/134 C |
| 5,020,510 A | * | 6/1991 | Jones ....................... 126/271.1 |
| 5,134,266 A | | 7/1992 | Peppard |
| 5,561,921 A | * | 10/1996 | Vanderlinden ............... 37/227 |

* cited by examiner

*Primary Examiner*—D. Glenn Dayoan
*Assistant Examiner*—Paul Chenevert
(74) *Attorney, Agent, or Firm*—John P. McGonagle (57) ABSTRACT

A vehicle with a self-contained cooling and heating capability and a tenting feature for sheltering and controlling the temperature at a given location. Warm air is directed out of a heat chamber through a telescopic tube arrangement which may be horizontally piovoted for improved heat direction. The tube arrangement may also be vertically tipped upwardly and downwardly to maximize directional control of heat output. Heat for melting snow may thereby be directed to specific locations. The tenting arrangement provides elevated and focused heating and little heat waste.

18 Claims, 6 Drawing Sheets

ALL-WEATHER STREET AND ROAD MAINTENANCE VEHICLE

BACKGROUND OF THE INVENTION

This invention relates to vehicles, and in particular, to a vehicle adapted for use in maintaining streets and roads regardless of weather conditions.

One of the greatest challenges for municipalities in maintaining their physical services is countering the effects of adverse weather conditions. Snow hinders roads and covers fire hydrants. Snow, rain and wind adversely affect the ability of municipalities to respond to and take action at accident scenes and other disaster locations. Conversely, high air temperatures make it difficult for workmen and the like to accomplish tasks at a given location for an extended period of time.

SUMMARY OF THE INVENTION

The present invention addresses the above problems by providing a vehicle with the capability of off-setting the weather conditions at a given location. Although the primary purpose of the present invention is to provide snow melting capability to selected areas, it also has the ability to provide cooling to an enclosed area. The above tasks are accomplished by providing a vehicle with a self-contained cooling and heating capability and a tenting feature for sheltering and controlling the temperature at a given location. Warm air is directed out of a heat chamber through a telescopic tube arrangement which may be horizontally pivoted for improved heat direction. The tube arrangement may also be vertically tipped upwardly and downwardly to maximize directional control of heat output. Heat for melting snow may thereby be directed to specific locations. The tenting arrangement provides elevated and focused heating and little heat waste.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Referring to the drawings in detail wherein like elements are indicated by like numerals, there is shown an equipment and control cab 40 and an air outlet unit 60 constructed according to the principles of the present invention. The cab 40 and outlet unit 60 may be mounted on a trailer or a vehicle 1. In the present example shown, the invention is mounted on a vehicle.

There is shown a vehicle 1 constructed according to the principles of the present invention. The vehicle 1 includes a chassis 10 mounted upon front and rear axles 11 supporting front and rear road wheels 13 and 14, respectively. The chassis 10 has a front 15, a rear 16, and two opposing sides 12, said front and rear defining a vehicle longitudinal axis, said opposing sides 12 defining a transverse axis. The chassis 10 includes longitudinally extending beams 17 coincident with the longitudinal axis of the chassis supported on the axles, and cross members 18 coincident with the transverse axis of the chassis connecting the beams 17. The foremost cross member is the front bumper 19 and the rearmost cross member is the rear bumper 20.

Figure 1:
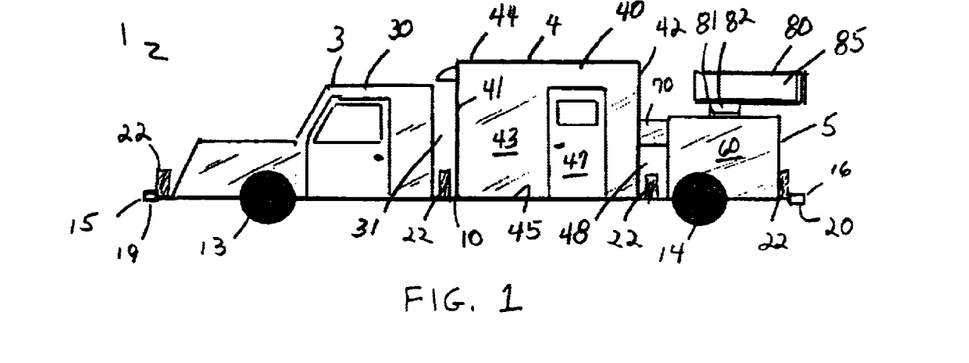
FIG. 1 is a side view of a vehicle constructed according to the invention.
Figure 2:
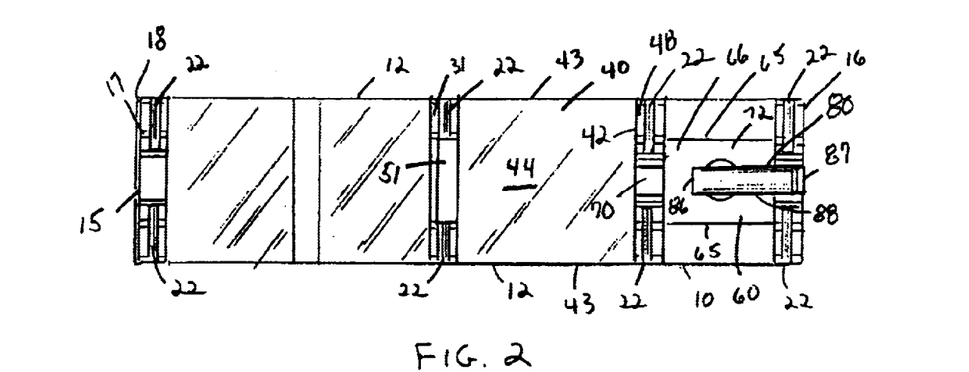
FIG. 2 is a top view thereof.
Figure 3:
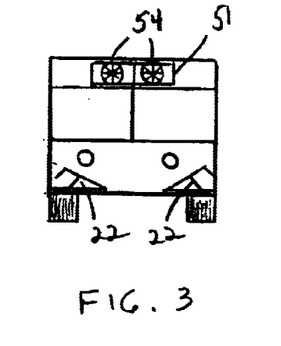
FIG. 3 is a front view thereof.
Figure 4:
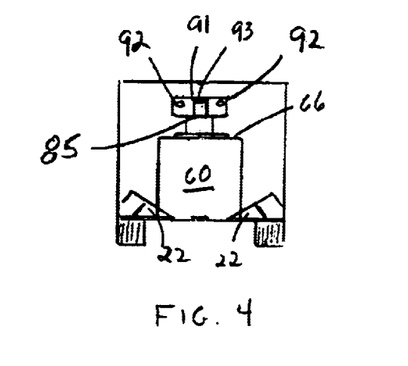
FIG. 4 is a rear view thereof.

The vehicle 1 may be longitudinally divided into three sections, a front driver's cab 30, a middle equipment and control cab 40, and an air outlet unit 60. There is a first longitudinal gap 31 between the driver's cab 30 and the control cab 40. There is a second longitudinal gap 48 between the control cab 40 and the air outlet unit 60. The front driver's cab 30 is a conventional driving cab with normal ignition, steering, throttle, and braking controls.

The equipment and control cab 40 has a front wall 41, a rear wall 42, opposing sides 43 interconnecting the front and rear walls, a roof 44 and floor 45, said walls, sides, roof and floor defining an equipment and control cab interior 46. One or both opposing sides 43 contain a door 47 for access into the cab interior 46. The vertical height of the walls and sides exceed the vertical height of the driver's cab 30.

Figure 5:
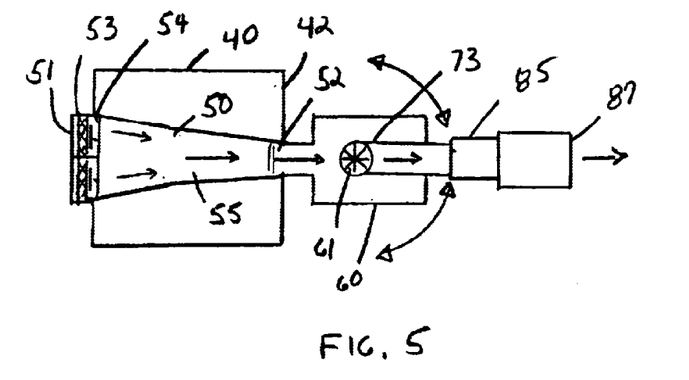
FIG. 5 is a top diagrammic view of the invention air path.
Figure 6:
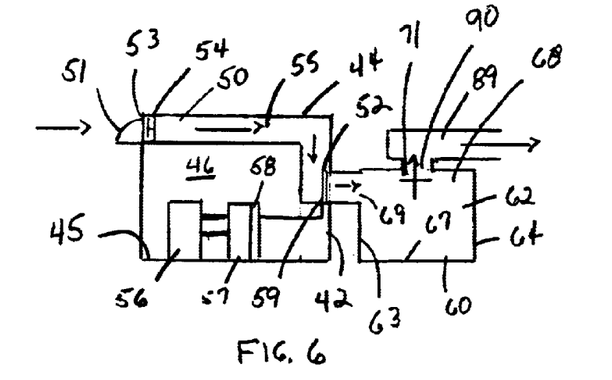
FIG. 6 is a side diagrammic view of the invention air path.

The equipment and control cab 40 contains a fiberglass air tunnel 50 with a forward end terminating in an open air scoop 51 formed in the equipment and control cab front wall 41 adjacent the control cab roof 44 and positioned above the driver's cab 30. The fiberglass air tunnel 50 contains screening 53 adjacent to the air scoop 51 for preventing airborne objects and other debris from entering into the tunnel 50. The tunnel 50 contains one or more intake fans 54 within the tunnel interior 55 immediately rearward of the screening 53. The tunnel 50 extends through the control cab interior 46 adjacent the control cab roof 44 and terminates in an open outlet 52 in the control cab rear wall 42. The open outlet 52 is interconnected to the air outlet unit 60.

The control cab 40 contains a diesel-powered electric turbine 56 rated at 330 amps along with three 10 gallon hot water heaters 57 producing a hot fluid mixture of anti-freeze and water circulating through three hot water circulators 58 which in turn pump the heated fluid through a plurality of one inch radiator pipes 59 installed in the tunnel open outlet 52. An exhaust fan 61 may be installed as well at the tunnel open outlet 52 to blow the heated air into the air outlet unit 60.

Figure 17:
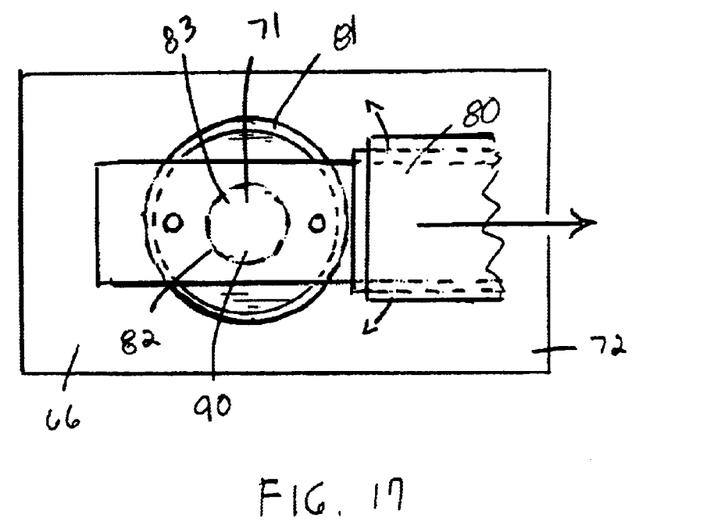
FIG. 17 is a top diagrammic view of the tube and heat chamber connection.
Figure 18:
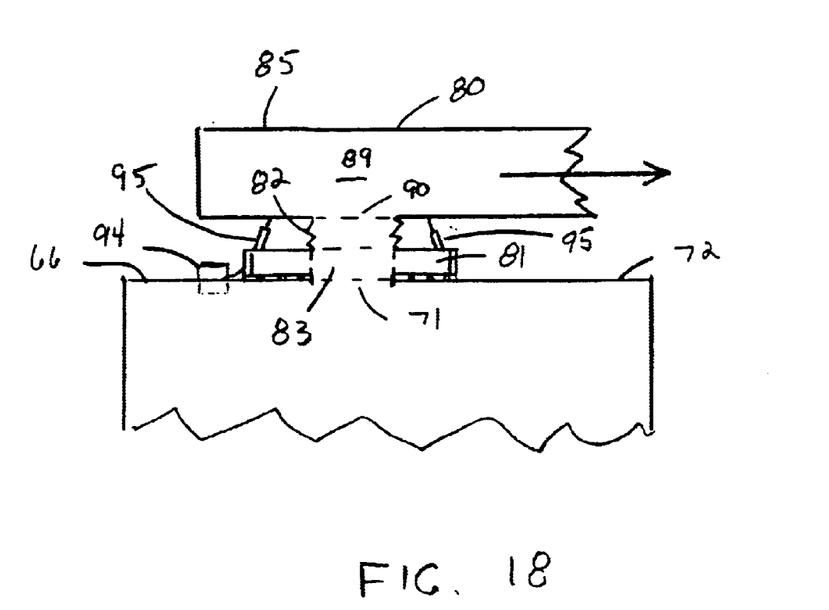
FIG. 18 is a side diagrammic view of the tube and heat chamber connection.

The air outlet unit 60 is comprised of a heat chamber 62 and a telescopic ejection tube apparatus 80 attached thereto. The heat chamber 62 has a forward wall 63, rearward wall 64, two opposing side walls 65 interconnecting the forward and rear walls, a top 66 and a bottom 67, said walls, top and bottom defining a heat chamber interior 68. The heat chamber forward wall 63 has an opening 69 formed therein and adapted to be interconnected by ducting 70 with the central cab outlet 52. The heat chamber top 66 has an opening 71 formed therein. A fan 73 is mounted within the heat chamber interior 68 and is positioned to blow heated air out through the top opening 71.

The ejection tube apparatus 80 includes a caster bearing 81, with a central opening 83, fixedly attached on the heat chamber exterior 72 about the top opening 71, said caster bearing central opening 83 being coincident with the heat chamber top opening 71. In one embodiment of the invention a spring collar 82 is mounted onto the caster bearing 81 over the caster bearing central opening 83. The ejection tube apparatus includes a telescoping tube 85 mounted on and pivotally attached to said caster bearing spring collar 82. The caster bearing 81 is adapted to horizontally pivot plus or minus one hundred and eighty degrees thereby pivoting the tube 85. The caster bearing 81 is driven by an electric motor 94 mounted on the heat chamber top 66 and electronically connected to and controlled within the equipment and control cab 40.

Figure 7:
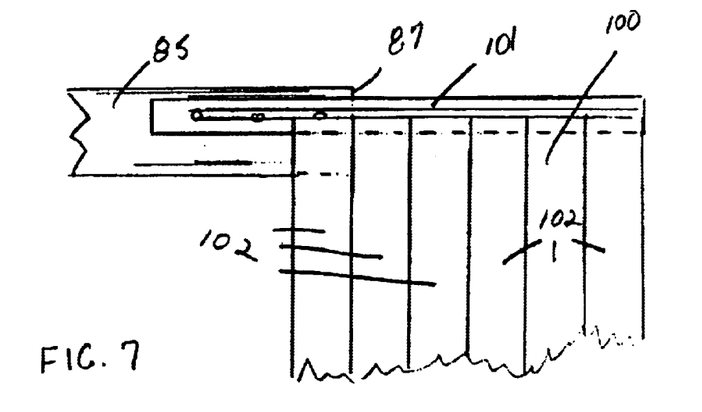
FIG. 7 is a close up side view of the tube distal end with canopy.

The tube 85 is adapted to telescopically extend from eight to fifteen feet. This may be done manually or be powered by the electric motor 94. The tube 85 has a proximal end 86, a distal end 87, and a cylindrical side wall 88 defining a tube interior 89. The cylindrical side wall 88 has an opening 90 formed therein near to the tube proximal end 86, said opening 90 providing direct access to the tube interior 89. The tube opening 90 is coincident with the heat chamber top opening 71. The tube distal end 87 may have a variable speed blower fan 91 contained therein to increase the heated air exhaust pressure.

In other embodiments of the invention, one or more lights 92 may be attached to the tube distal end 87, said lights adapted for illumination of the exhaust air output target. A video camera eye 93 could also be attached to the tube distal end 87 so that an operator could view the exhaust output without leaving the cabs 30 or 40.

It may be desirable to elevate or lower the distal end 87 of the tube arrangement 85. In one embodiment of the invention this is accomplished by the installation of two electric, hydraulic or pneumatic pistons 95 on the caster bearing 81 and interconnected to the tube arrangement 85 on each side of the top opening 71. Although a single piston 95 is adequate, it would be preferable to use two pistons 95 which would provide greater control under harsh weather conditions.

The tube 85 has a deployable canopy section 100 attached thereto and deployable with the tube distal end 87. The canopy 100 section is comprised of two elongated attachment elements 101 adapted for attachment to each side of the tube side wall 88 adjacent the tube distal end 87. Each attachment element 101 has a plurality of plastic strips 102 extending therefrom, each plastic strip being preferably six inches wide and approximately four feet long. The plastic strips 102 are easily bundled and stowed on the vehicle when not in use. The canopy section 100 is adapted to focus heat exhaust from the tube 85 into a defined area, e.g., a snow covered hydrant.

Figure 8:
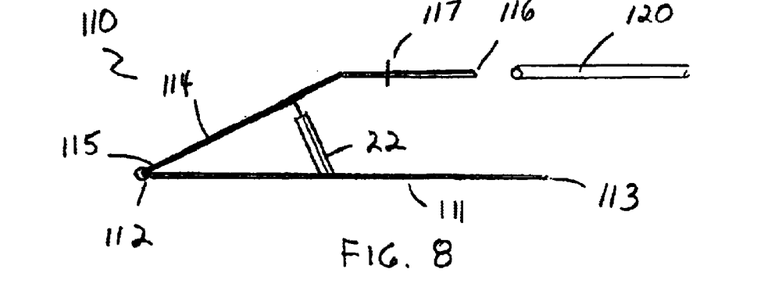
FIG. 8 is a side view of the pivot bar arrangement.
Figure 11:
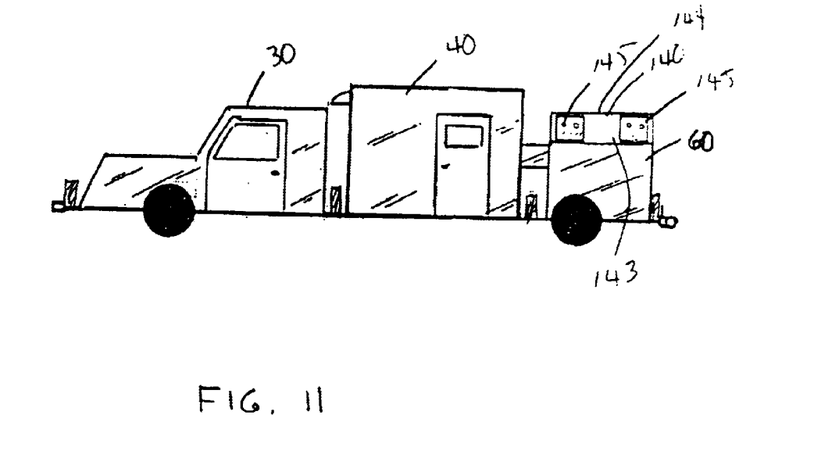
FIG. 11 is a side view of a warm weather embodiment of the invention.
Figure 12:
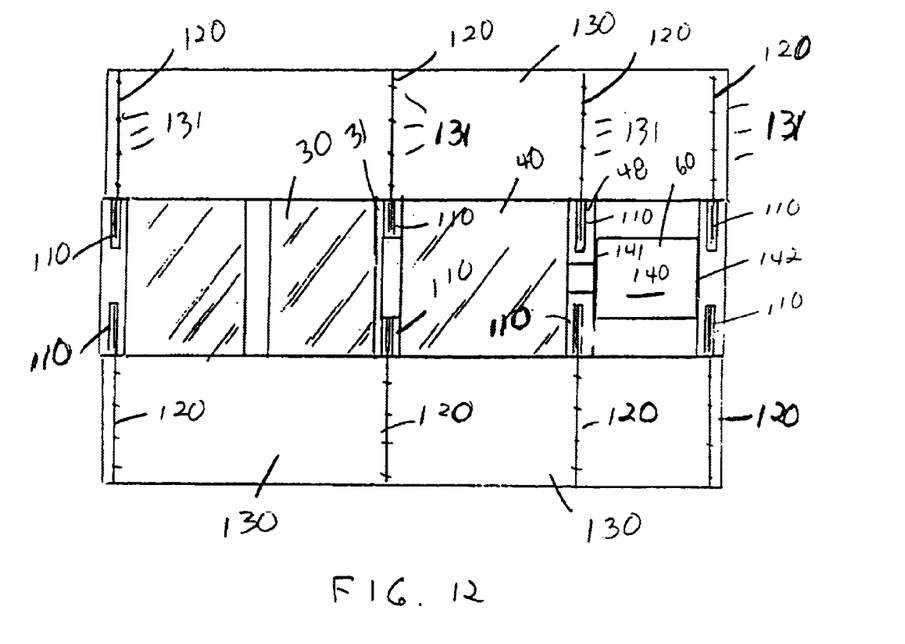
FIG. 12 is a top view thereof with tent deployed.
Figure 13:
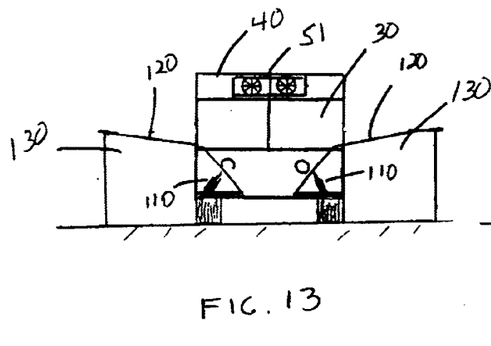
FIG. 13 is a front view thereof.
Figure 14:
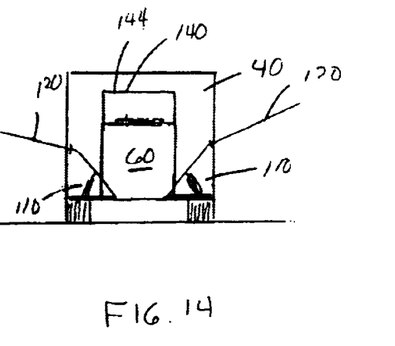
FIG. 14 is a rear view thereof.
Figure 15:
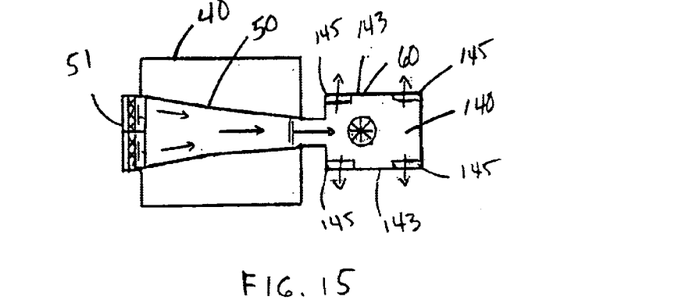
FIG. 15 is a top diagrammic view of the air path for this embodiment.
Figure 16:
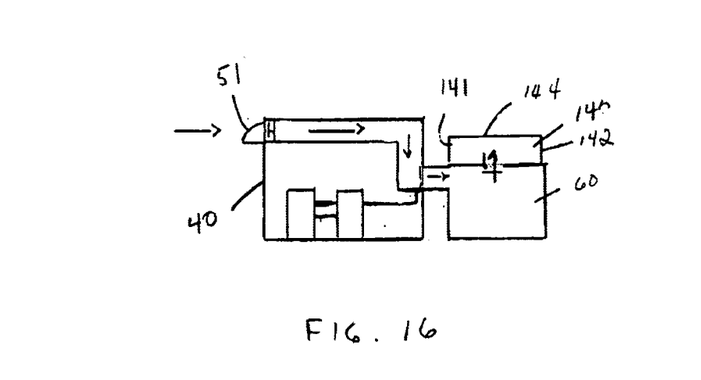
FIG. 16 is a side diagrammic view thereof.

The present invention may also be adapted for use in warm weather. The invention is adapted to set up a tent 130 on each side of the vehicle 1. Two sets of four hydraulic tent pistons 22 are installed on each side of the vehicle chassis 10, each set being comprised of one on the front bumper 19, two on the rear bumper 20, one in the first gap 31 and the last in the second gap 48. Each hydraulic tent piston 22 is connected to a steel pivotal bar arrangement 110, comprised of an elongated base element 111 fastened to a chassis cross member 18, each base element having an inside end 112 and an outside end 113, said ends defining a longitudinal axis which is parallel to the longitudinal axis of a cross member 18. The base element outside end 113 is that end attached adjacent the chassis side 12. The pivotal bar arrangement 110 is further comprised of an elongated pivot bar 114 having two ends, one a pivot end 115 and the other a tent end 116. The pivot bar pivot end 115 is pivotally joined to the base element inside end 112. Each hydraulic tent piston 22 is attached at one end to the base element 111 and at the other end to the pivot bar 114. Elongated and hollow aluminum extender pipes 120 are attachable to the pivot bar tent ends 116. Each pivot bar 114 has a radial flange stop element 117 formed therein a desired distance from the pivot bar tent end 116.

Figure 9:
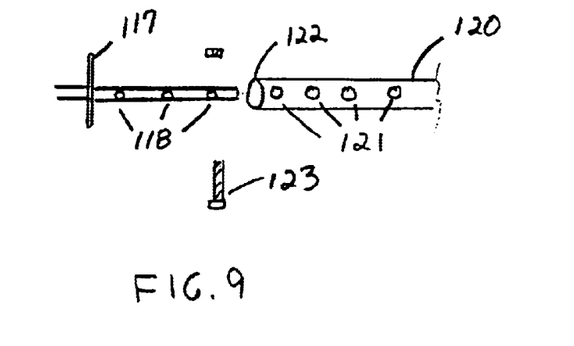
FIG. 9 is a close up view of the pivot bar tent end.

Elongated and hollow aluminum extender pipes 120 are attachable to the pivot bar tent ends 116 up to the stop elements 117. The extender pipes 120 have a diameter slightly greater than the pivot bars 114 and less than the stop elements 117. For security several holes 121 are drilled through the diameter of the extender pipes 120 near to an extender pipe engagement end 122. Corresponding holes 118 are drilled through the diameters of the pivot bar between the stop elements 117 and the pivot bar tent ends 116. Engagement clasping pins 123 are adapted to be inserted through the holes 118, 121 to secure the extender pipes 120 to the pivot bars 114.

Figure 10:
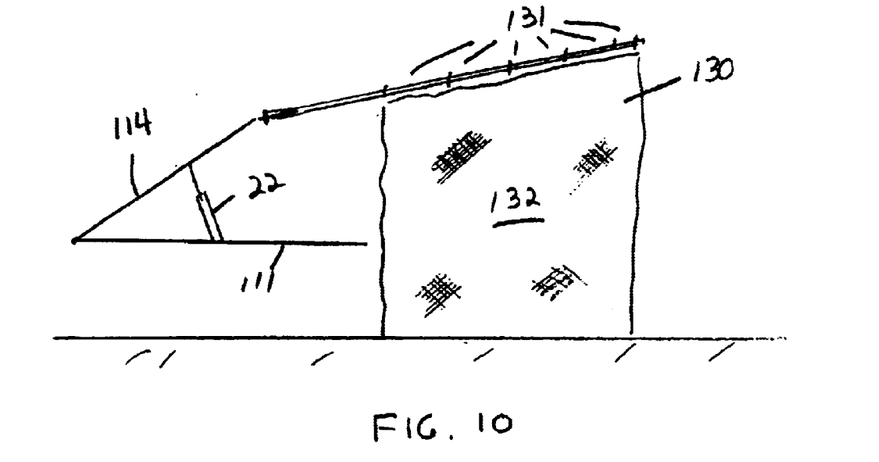
FIG. 10 is a side view of the pivot bar arrangement with tent.

A tent 130 would be deployable on each side of the vehicle 1. Each tent would have looping 131 about its external surface 132 for engagement with the extender pipes 120. The tents 130 would be made from a lightweight, insulated and fireproof material.

In the warm weather embodiment of the present invention, the ejection tube 85 is removed. A fiber glass box 140 is installed over the air outlet unit top 66. The box 140 has a forward wall 141, a rear wall 142, two opposing side walls 143 and a top 144, the air outlet unit top 66 acting as a box floor. One or two air conditioning units 145 are installed in each side wall 143. The air conditioning units 145 draw in outside air through the air tunnel 50 and air outlet unit top opening 71. Each tent 130 is either partially draped over the box 140 or has openings fitted about the air conditioning units.

It is understood that the above-described embodiment is merely illustrative of the application. Other embodiments may be readily devised by those skilled in the art which will embody the principles of the invention and fall within the spirit and scope thereof.

I claim:

1. An all-weather street and road maintenance vehicle with a self-contained cooling and heating capability and a tenting feature for sheltering and controlling the temperature at a given location, comprising:

a vehicle with a chassis mounted upon front and rear axles supporting front and rear road wheels, said chassis having a front, a rear, and two opposing sides, said front and rear defining a vehicle longitudinal axis, said opposing sides defining a transverse axis, said chassis having a plurality of longitudinally extending beams coincident with the longitudinal axis of the chassis and supported on said axles, and cross members coincident with the transverse axis of the chassis and connecting the beams, a foremost cross member comprised of a front bumper and a rearmost cross member comprised of a rear bumper;

a front driver's cab mounted on said chassis adjacent said front bumper, said front driver's cab having a plurality of vehicle ignition, steering, throttle, and braking controls;

an air outlet unit mounted on said chassis adjacent said rear bumper;

an equipment and control cab mounted on said chassis and longitudinally positioned between said front driver's cab and said air outlet unit;

a first longitudinal gap between said front driver's cab and said equipment and control cab; and a second longitudinal gap between the said equipment and control cab and said air outlet unit.

2. A vehicle as recited in claim 1, wherein:

said equipment and control cab has a front wall, a rear wall, two opposing sides interconnecting the front and rear walls, a roof and a floor, said walls, sides, roof and floor defining an equipment and control cab interior, said opposing sides having a plurality of doors for access into the equipment and control cab interior, said walls and sides having a vertical height exceeding a vertical height of the front driver's cab.

3. A vehicle as recited in claim 2, wherein:

said equipment and control cab interior contains a fiberglass air tunnel with a forward end terminating in an open air scoop formed in the equipment and control cab front wall adjacent the control cab roof and positioned vertically above the driver's cab, said fiberglass air tunnel having a screen adjacent the air scoop, said tunnel having a plurality of intake fans within a tunnel interior immediately rearward of the screen, said tunnel extending through the control cab interior adjacent the control cab roof and terminating in an open outlet in the control cab rear wall, said open outlet being interconnected to the air outlet unit.

4. A vehicle as recited in claim 3, further comprising:

a power turbine within said equipment and control cab;

a plurality of hot water heaters powered by said turbine;

a plurality of hot water circulators connected to said hot water heaters;

a plurality of radiator pipes connected to said circulators and attached across said tunnel open outlet.

5. A vehicle as recited in claim 4, wherein the air outlet unit is comprised of:

a heat chamber having a forward wall, a rearward wall, two opposing side walls interconnecting the forward and rear walls, a top and a bottom, said walls, top and bottom defining a heat chamber interior, said heat chamber forward wall having an opening formed therein and interconnected by ducting with the central cab outlet, said heat chamber top having an opening formed therein, said heat chamber interior having a fan mounted therein and positioned to blow heated air out through the top opening; and a telescopic ejection tube apparatus attached to said heat chamber, said tube apparatus having a caster bearing, with a central opening, fixedly attached on the heat chamber exterior about the top opening, said caster bearing central opening being coincident with the heat chamber top opening, said tube apparatus having a spring collar mounted onto the caster bearing over the caster bearing central opening.

6. A vehicle as recited in claim 5, wherein:

the ejection tube apparatus has a telescoping tube mounted on and pivotally attached to said caster bearing spring collar, said caster bearing adapted to horizontally pivot thereby pivoting the tube, said caster bearing being driven by a motor mounted on the heat chamber top and electrically connected to and controlled within the equipment and control cab.

7. A vehicle as recited in claim 6, wherein:

said telescoping tube having a proximal end, a distal end, and a cylindrical side wall defining a tube interior, said cylindrical side wall having an opening formed therein near to the tube proximal end, said opening providing direct access to the tube interior, said tube opening beings coincident with the heat chamber top opening.

8. A vehicle as recited in claim 7, further comprising:

a deployable canopy section attached to the tube distal end.

9. A vehicle as recited in claim 8, wherein:

the canopy section is comprised of two elongated attachment elements each adapted for attachment to a side of the tube side wall adjacent the tube distal end, each attachment element having a plurality of plastic strips extending therefrom.

10. A vehicle as recited in claim 9, further comprising:

a plurality of pistons on the caster bearing about the top opening, said pistons being interconnected to the tube arrangement, said pistons adapted to elevate and lower the distal end of the tube arrangement.

11. A vehicle as recited in claim 10, further comprising:

an exhaust fan attached at the tunnel opening outlet.

12. A vehicle as recited in claim 11, further comprising:

a variable speed blower fan attached within the tube distal end.

13. A vehicle as recited in claim 12, further comprising:

a plurality of lights attached to the tube distal end.

14. A vehicle as recited in claim 13, further comprising:

a video camera eye attached to the tube distal end.

15. A vehicle as recited in claim 4, wherein the air outlet unit is comprised of:

a chamber having a forward wall, a rearward wall, two opposing side walls interconnecting the forward and rear walls, a top and a bottom, said walls, top and bottom defining a chamber interior, said chamber forward wall having an opening formed therein and interconnected by ducting with the central cab outlet, said chamber top having an opening formed therein; and a hollow box installed over the chamber top, said box having a forward wall, a rear wall, two opposing side walls and a top, the chamber top acting as a box floor;

a plurality of air conditioning units fitted into each box side wall, said air conditioning units adapted to draw air through the air tunnel and air outlet unit top opening;

two sets of four tent pistons attached on each side of the vehicle chassis, each set being comprised of one on the front bumper, one on the rear bumper, one in the first gap and the last in the second gap; and a plurality of interconnected tents attached to said tent pistons and interconnected with said air conditioning units.

16. A vehicle as recited in claim 15, wherein:

each tent piston is connected to a pivotal bar arrangement comprised of an elongated base element fastened to a chassis cross member, each base element having an inside end and an outside end, said ends defining a longitudinal axis which is parallel to the longitudinal axis of a cross member, said base element outside end being that end attached adjacent the chassis side, said pivotal bar arrangement being further comprised of an elongated pivot bar having two ends, one a pivot end and the other a tent end, said pivot bar pivot end being pivotally joined to the base element inside end, each hydraulic tent piston being attached at one end to the base element and at the other end to the pivot bar.

17. A vehicle as recited in claim 16, further comprising:

a plurality of elongated and hollow aluminum extender pipes attachable to the pivot bar tent ends, each pivot bar having a radial flange stop element formed therein a desired distance from the pivot bar tent end, said extender pipes being attachable to the pivot bar tent ends up to the stop elements, said extender pipes having a diameter slightly greater than a pivot bar diameter and less than a stop element diameter.

18. A vehicle as recited in claim 17, wherein:

each tent has an external surface with looping adapted for engagement with the extender pipes.

\* \* \* \* \*